L. FELLBERG.
BURNER FOR INCANDESCENT LAMPS.
APPLICATION FILED JULY 9, 1908.

930,063.

Patented Aug. 3, 1909.

Witnesses:
Walao M. Chapin
Mary S. Handy

Inventor,
Louis Fellberg.
by
Rosenbaum & Stockbridge
Attys.

UNITED STATES PATENT OFFICE.

LOUIS FELLBERG, OF RIXDORF, NEAR BERLIN, GERMANY.

BURNER FOR INCANDESCENT LAMPS.

No. 930,063.   Specification of Letters Patent.   Patented Aug. 3, 1909.

Application filed July 9, 1908. Serial No. 442,688.

*To all whom it may concern:*

Be it known that I, LOUIS FELLBERG, engineer, subject of the King of Prussia, residing at Rixdorf, near Berlin, Germany, have invented new and useful Improvements in Burners for Incandescent Lamps, of which the following is a specification.

The present invention relates to burners for oil lamps having a central air admission tube.

The present burner is designed to permit altering or changing such lamps into incandescent lamps, the admission and distribution of the air being so favorably arranged that the settling of oily substances near the wick is entirely avoided. Thus a perfect combustion of the oil as well as a high luminous effect is realized.

Figure 1:
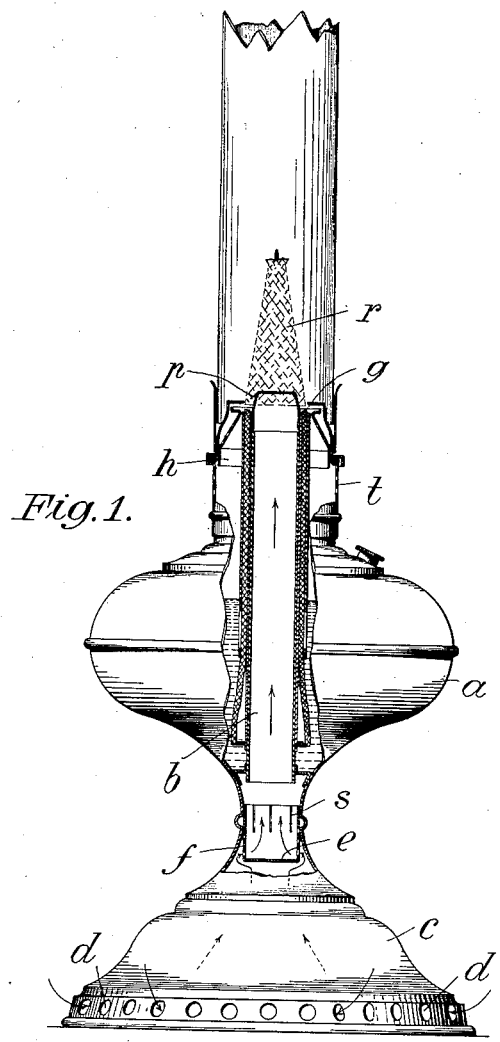
Figure 2:
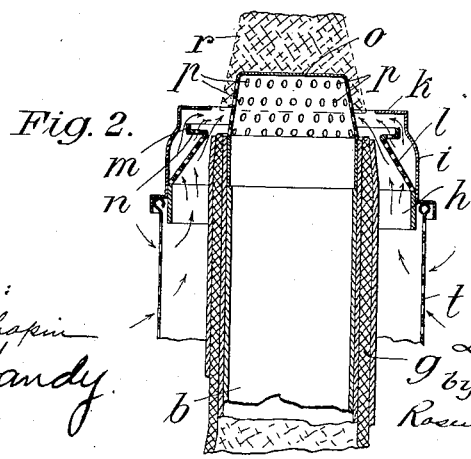

In the drawings: Figure 1 is a side elevation, partly in section, of a lamp embodying the principles of my invention; Fig. 2 is an enlarged partial sectional view of the same, showing details of the burner.

Vertically upward through the center of the oil reservoir $a$ of the lamp there passes an air admission tube $b$ the air streaming into it from the base $c$ of the lamp in the direction of the arrows. For this purpose the base is provided with air inlets $d$. Beneath the air admission tube $b$ I provide a cap $e$ having a closed bottom face and side walls which are perforated to produce air inlets $f$. The purpose of this cap is to prevent the air from streaming straight upwardly to the top of the burner, the arrangement of the openings $f$ causing the air to be forced toward the center of the tube $b$. Cap $e$ is preferably punched from sheet metal with vertical slots $s$ extending inward from its upper edge so as to make it flexible and enable it to be sustained by the spring tension in its proper position as shown in Fig. 1.

The burner cap $h$ is mounted on the perforated cylinder $i$ which is in turn supported from the frame $a$ of the lamp. The air passes through the perforations of the cylinder $t$ and from thence upwardly through a plurality of paths. The burner cap has a perforated conical portion $l$ through which part of the current of air passes, a small quantity passing inside the cone and directly around the upper edges of the wick. The conical sieve $l$ has an outwardly and upwardly directed flange $m$ at its upper small end and which is also perforated with openings $n$. The air which passes through the conical sieve $l$ divides into portions which pass through the openings $n$ and around the outside surface of the flange $m$. The latter current is directed inward by a hood $k$ with a flat surface directly above the flange $m$.

The incandescent mantle $r$ is suspended above the wick so that its lower edge is located substantially in the central opening of the hood $k$. Within the mantle and at the upper end of the tube $b$ there is provided a perforated thimble $o$ through the openings of which air from the tube $b$ streams outward. This current meets the various streams of air passing within and through the conical sieve $l$ as already described.

An analysis of the foregoing will show that above every point of the wick there play a plurality of separate streams or currents of air, all directed so as to produce the most efficient combustion. One current which passes within the sieve $l$ flows directly across the upper edge of the wick, producing proper combustion thereat and preventing oily and sooty deposits. This air from this source is, however, not alone sufficient to produce a blue flame. The various other air currents impinging on the flame at successively increased elevations, furnish the means of creating the intensely hot blue flame which is required for an incandescent mantle.

It may be observed that in an oil lamp a certain air pressure or air moving force is created by the chimney draft, but the amount of air which can be set in rapid motion from this cause is limited. If too large openings improperly arranged and distributed are provided, the efficiency of the chimney draft as a means of producing air pressure, is cut down. Accordingly it is necessary to be economical in the size and in the arrangement of the various air openings so that very minute streams of air shall have an appreciable pressure due to the chimney draft to force each against the flame in a definite stream. This is the purpose of my invention, namely to have a number of streams every one of which is arranged to do its work most effectively and which are so distributed that a substantial air pressure is present to give each individual stream the requisite velocity to do its work. For example, without the cap $e$ and the thimble $o$, an excessive current of air would flow uselessly upward through the center tube $b$, cutting down the effective suction of the chimney draft so that practically no air would enter within and around the conical sieve $l$. My invention therefore may be said to lie in the arrangement of parts by which the various air streams described are properly created and maintained at proper efficiency by the chimney draft available.

What I claim is:

1. In a burner for incandescent lamps, a cylindrical wick, a perforated thimble supported to project upward from within said wick, and a conical sieve outside the wick, said sieve having an upwardly and outwardly directed flange at its upper end, and located to divide an air current to pass partly within and partly through and around the sieve.

2. In a burner for incandescent lamps, a cylindrical wick, a perforated thimble supported to project upward from within the same, and a conical sieve surrounding the wick and having an upwardly and outwardly directed perforated flange at its upper end, whereby a current of air is divided into three streams, one of which passes wholly within said sieve, one of which passes through said flange, and another of which passes around said flange.

In testimony whereof I have signed my name to this specification in the presence of two subscribing witnesses.

LOUIS FELLBERG.

Witnesses:
HENRY HASPER,
WOLDEMAR HAUPT.